M. STEPHENS.
Branch Couplings for Cement Pipes.

No. 125,345.          Patented April 2, 1872.

125,345

UNITED STATES PATENT OFFICE.

MELVIN STEPHENS, OF BROOKLYN, NEW YORK.

IMPROVEMENT IN BRANCH-COUPLINGS FOR CEMENT PIPES.

Specification forming part of Letters Patent No. 125,345, dated April 2, 1872.

*To all whom it may concern:*

Be it known that I, MELVIN STEPHENS, of Brooklyn, in the county of Kings and State of New York, have invented and made an Improvement in Branch-Couplings for Wrought-Iron and Cement Pipe; and the following is declared to be a correct description of the same.

Water-pipes have been made of sheet-iron lined and coated with cement, and various devices have been made for uniting the branch pipes, but the cement is frequently broken, either by the drills that have been used or by the workman in soldering the tap to the wrought-iron. In the latter case the iron is not always covered up again with cement, and rusts and breaks away. In some cases thimbles have been employed filled with cement, but these are difficult to open, because the cement hardens and injures the drills, and frequently the thimble is worked loose in removing the cement and there is a leak around the same. In other instances a screw-coupling with a closed end has been inserted into a hole in the metal pipe and secured by the cement, but the latter is liable to break when the connection is being made, or the coupling to work loose in the cement.

My invention is made for overcoming the foregoing difficulties, and consists in a screw-socket with a closed metallic end, attached to the iron pipe by a nut previous to the pipe being lined and coated with cement, so that said screw-socket will remain in place, and, when required for use, a stop-cock is to be screwed into the socket and the closed metal end bored through, thereby enabling the plumber to make a connection to the cement water-pipe with great facility and reliability, and the cement is not broken in tapping the pipe, neither is the drill injured by the cement.

Figure 1:
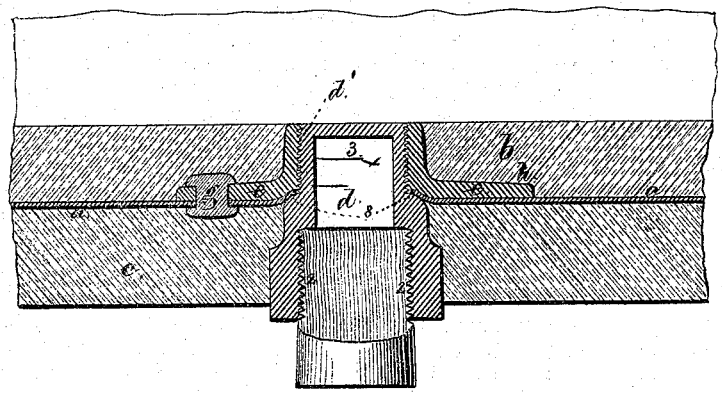
Figure 2:
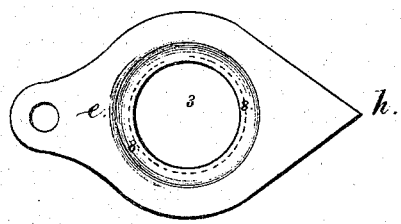

In the drawing, Figure 1 is a section of the coupling-socket, in place, attached to a pipe. Fig. 2 is a plan of the nut separate from the pipe.

The metal tube $a$, usually of wrought-iron, is riveted at the lapping joint, and the lining $b$ and coating $c$ are of the usual character. A hole is made in the iron tube $a$ at the desired place, and the screw $d'$ of the coupling is passed through the hole into the nut $e$. This coupling has an internal screw-thread, 2, and a closed end, 3, as shown. The coupling is secured firmly into the nut and clamps the sheet metal between the coupling and nut $e$, and, in subsequently screwing the cock into the coupling, the parts will be made tighter should there be any motion in the coupling $d$. It is to be understood that the coupling is attached to the iron pipe before the lining or the coating are applied, and a rivet, $g$, may be inserted to aid in keeping the socket from turning. The pointed end $h$ may also be employed to deflect the wings of the lining instrument and prevent its being arrested in its movement by the projecting coupling. After the stop-cock has been screwed into the socket a drill is inserted through the same and the metal end 3 bored through to admit water to pass to the stop-cock, and when the drill is withdrawn the connection is complete. A lead or other pipe can be attached to the stop-cock. In attachments heretofore employed the nut has been flat, and also the coupling; hence the iron pipe is flattened at the place where the same is clamped. This is detrimental, particularly with small pipes. In my attachment the surface of the coupling is made concave at 8, so that the pipe at the edge of the hole is bent down into the concave and is clamped between rounding surfaces, so as to make a tight joint without flattening the pipe, and at the same time the edges of the sheet-iron all around the hole are firmly secured.

I claim as my invention—

1. The coupling $d$, for sheet-metal and cement pipes, made with the internal screw-thread 2, external screw $d'$, and closed end 3, in combination with the nut $e$, into which the screw $d'$ is passed to clamp the sheet metal of the pipe, as set forth.

2. The coupling for sheet-metal and cement pipe, made with a concave surface, 8, into which the edges of the sheet-iron around the hole are bent down and clamped, as set forth.

Signed by me this 13th day of February, A. D. 1872.

MELVIN STEPHENS.

Witnesses:
GEO. T. PINCKNEY,
CHAS. H. SMITH.